United States Patent [19]
Beck et al.

[11] Patent Number: 5,941,138
[45] Date of Patent: Aug. 24, 1999

[54] APPARATUS FOR THE CONTINUOUS PATH-CONTROLLED SHARPENING OF SAW TOOTHINGS

[75] Inventors: Ernst Beck, Maselheim; Bruno Hensinger, Laupheim-Obersulmetingen; Peter Lenard, Biberach, all of Germany

[73] Assignee: Vollmer Werke Maschinfabrik GmbH, Riss, Germany

[21] Appl. No.: 08/945,379

[22] PCT Filed: May 15, 1996

[86] PCT No.: PCT/EP96/02097

§ 371 Date: Sep. 29, 1997

§ 102(e) Date: Sep. 29, 1997

[87] PCT Pub. No.: WO96/37328

PCT Pub. Date: Nov. 28, 1996

[30] Foreign Application Priority Data

May 22, 1995 [DE] Germany .............................. 195 18 709

[51] Int. Cl.⁶ .............................. B23D 63/12; B24B 53/12
[52] U.S. Cl. ....................................... 76/41; 76/43
[58] Field of Search ................................... 76/37, 40, 43, 76/77, 122, 41, 46, 47.1

[56] References Cited

U.S. PATENT DOCUMENTS

| | | | |
|---|---|---|---|
| 4,023,446 | 5/1977 | Annas et al. | 76/40 |
| 4,082,014 | 4/1978 | Idel | 76/43 |
| 4,693,145 | 9/1987 | Gustavsson | 76/112 |

FOREIGN PATENT DOCUMENTS

| | | |
|---|---|---|
| 2921196 | 12/1980 | Germany . |
| 3527059 | 5/1986 | Germany . |
| 9400697 | 8/1994 | Germany . |

*Primary Examiner*—Hwei-Siu Payer
*Attorney, Agent, or Firm*—Clifford W. Browning; Woodard, Emhardt, Naughton, Moriarty & McNett

[57] ABSTRACT

The apparatus comprises a saw blade holder (24), a grinding slide (30) which carries a profiled grinding wheel (38) and is movable to and fro in a strokewise manner with respect to the saw blade holder (24), and a feed slide (40) by means of which a saw blade (10) in the saw blade holder (24) can be advanced in a stepwise manner. A dressing template (50) is arranged at the apparatus in a normally inoperative position and can be moved in intervals into an operative position in which the grinding wheel (38) is dressed by plunging into the dressing template (50). The feed slide (40) can be put out of operation during the dressing intervals. The stroke of the grinding slide (30) is adjustable prior to the next plunging motion into the saw blade (10) corresponding to the radius decrease of the grinding wheel (38) effected by dressing. This simplifies the dressing operation of the grinding wheel (38) and shortens the time required for each dressing operation.

5 Claims, 2 Drawing Sheets

APPARATUS FOR THE CONTINUOUS PATH-CONTROLLED SHARPENING OF SAW TOOTHINGS

In such apparatuses the grinding slide on the one hand and the feed slide on the other hand are controlled by a CNC control or a cam control system in such a manner that the grinding wheel plunges along a tooth face each into a tooth gap of the toothing of a saw blade while the feed slide remains stationary. As soon as the grinding wheel has reached the bottom of the tooth, a feed motion of the saw blade commences which is initiated by a driver in the form of a finger or a latch, which is supported at the feed slide, acting on a neighbouring tooth face. During the feed motion the grinding wheel generally plunges still deeper into the bottom of the tooth, and is then gradually retracted in order to sharpen the adjacent tooth back and finally its uppermost part which belongs to the tooth tip, the so-called flank. For this type of continuous path-controlled sharpening of saw toothings a grinding wheel is required which at its periphery comprises a profile which is adapted in a certain manner to the toothing profile.

Due to wear, the grinding wheel periphery gradually assumes a deviating profile; it is therefore necessary to dress the grinding wheel from time to time. For this purpose, the use of dressing diamonds is known which act on the grinding wheel in a spot-type manner and which can be moved under continuous path control in an own coordinate system, which is independent of the grinding device. Diamond dressing rolls are also known with a profile which complements the intended peripheral profile of the grinding wheel and which are also supported in an own device to be adjustable in at least two coordinates so that they can be brought into engagement with the grinding wheel which is only rotating while the grinding slide is stationary.

The invention is based on the object to simplify the dressing of grinding wheels in an apparatus for the continuous path-controlled sharpening of saw toothings and to shorten the required time for each dressing operation.

The dressing template according to the invention which preferably consists, at least partially, of polycrystalline diamond requires little space and can therefore be located at the apparatus for the continuous path-controlled sharpening of saw toothings in the immediate vicinity of the saw blade in a space-saving manner in an inoperative position where the template does not interfere with the sharpening of saw toothings. In the sharpening intervals the template has therefore to cover only a small travel from its inoperative position into a preferably stationary, i.e. not variable, operative position in order to provide the conditions for the grinding wheel to now plunge into the template instead of into the saw toothing, by means of which it will be dressed in a single working stroke of the grinding slide. The dressing operation by means of the template differs from the normal operation during sharpening of saw toothings merely in that the feed slide is put out of action, i.e. either stopped entirely or rendered inactive in another manner, during the dressing intervals and that the stroke of the grinding slide is shifted or shortened.

An embodiment of the invention will be described in the following with reference to schematic drawings with further details. In the drawings.

Figure 1:
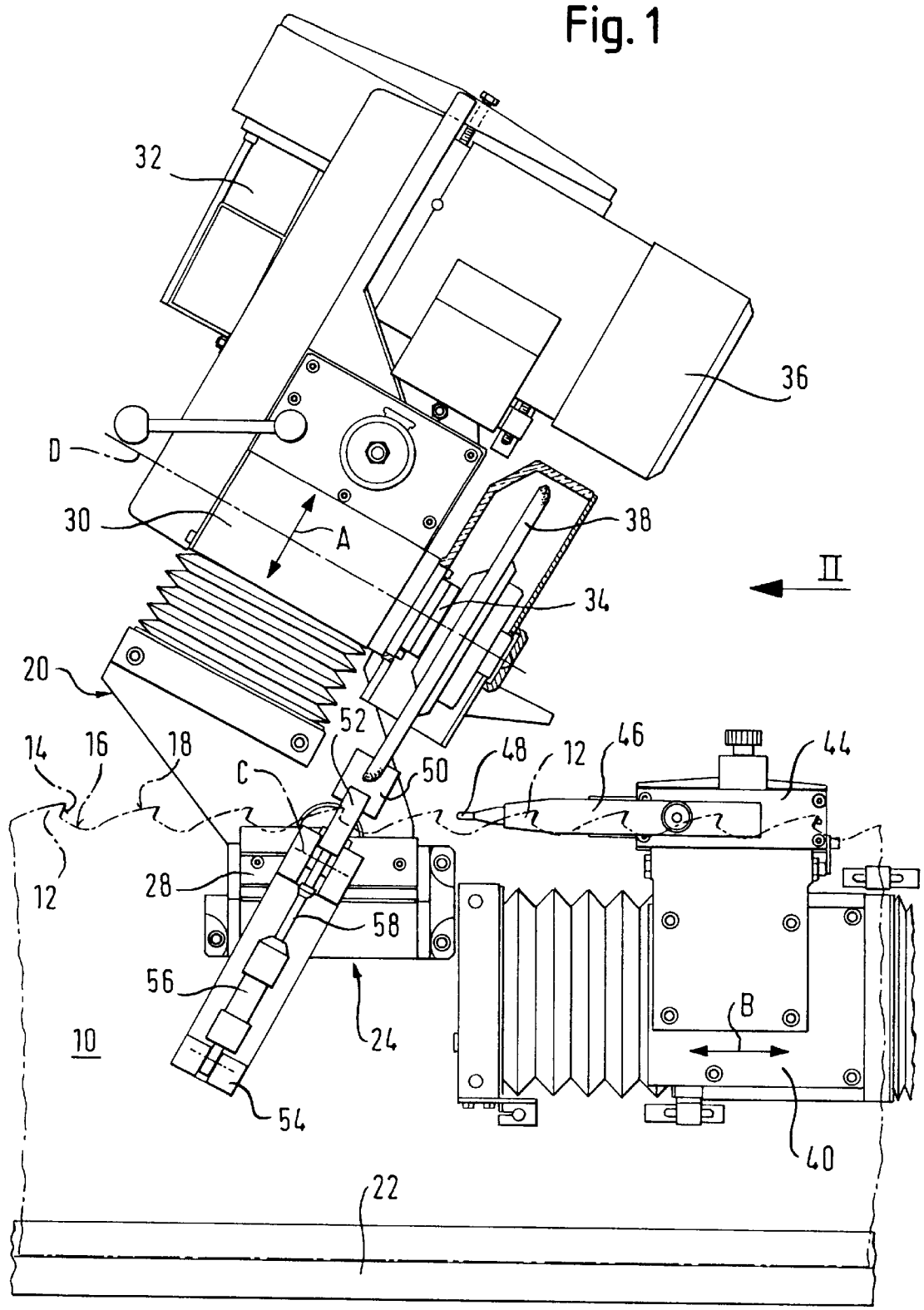
FIG. 1 shows the front view of an apparatus according to the invention.
Figure 2:
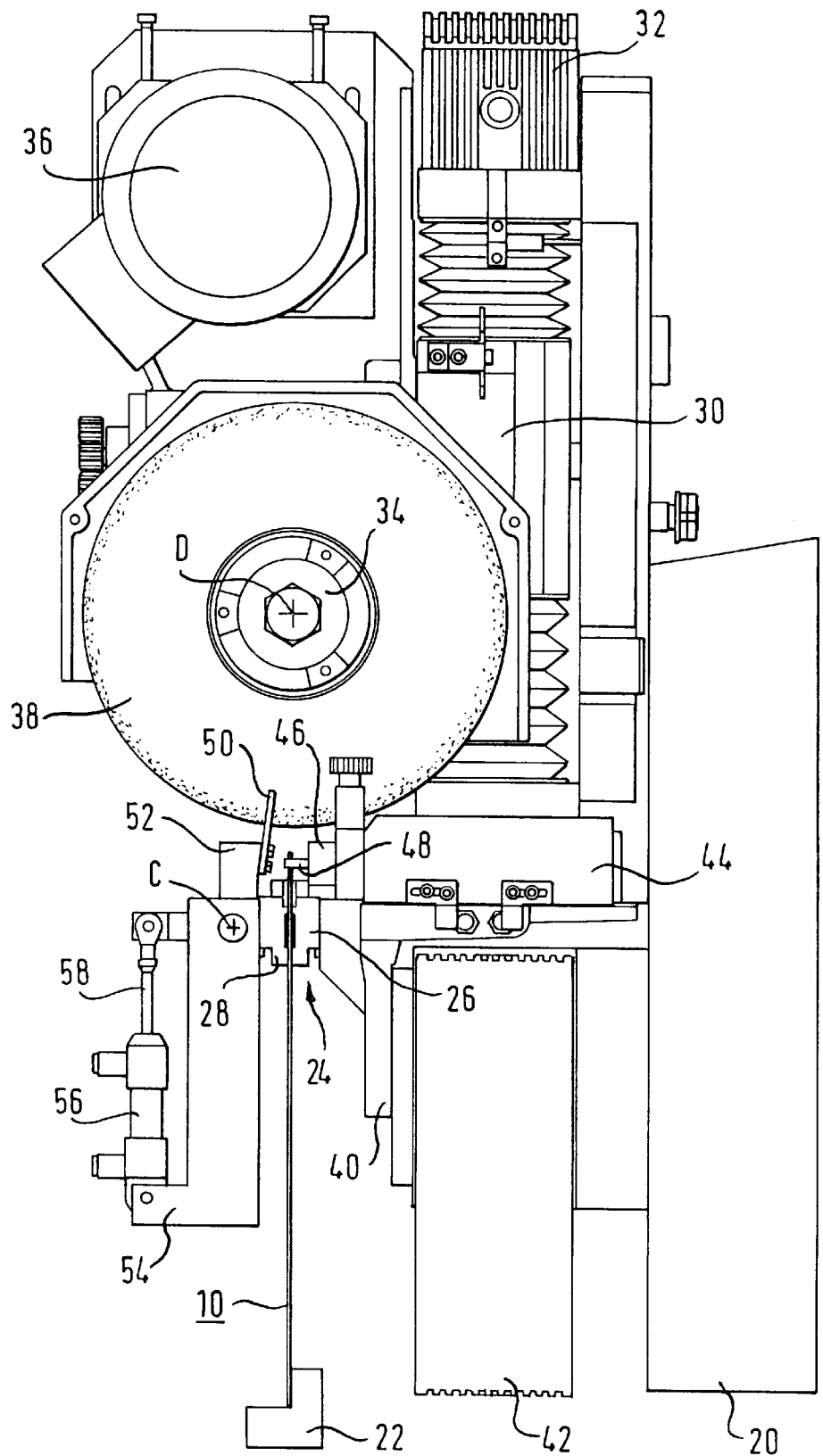
FIG. 2 shows the side view in the direction of the arrow II in FIG. 1.

In the drawings, a band saw blade is illustrated as an example of a saw blade 10 the toothing of which is to be sharpened; in the present context, however, the term saw blade covers a mill saw blade or a circular saw blade as well. In each case, a saw blade 10 with teeth 12 is involved, which are machined in a continuous path-controlled sharpening operation at their tooth faces 14 and additionally at their tooth bottoms 16 and tooth backs 18.

The apparatus for the sharpening of the saw blade 10 has a machine frame 20 with a saw blade guide 22 which in the illustrated example is formed by a horizontal rail and adjustable in height corresponding to the width of the saw blade 10. Above the saw blade guide 22 a saw blade holder 24 is arranged which in the illustrated example has a stationary jaw 26 and an adjustable jaw 28. The adjustable jaw 28 is biased in the usual manner in the direction of the stationary jaw 26 so that the saw blade 10 is held between the jaws in a vibration-free manner without being impeded in a feed motion.

At the machine frame 20 a grinding slide 30 can be moved upwards and downwards under an adjustable angle relative to the saw blade guide 22 in the direction of the double arrow A by means of a stroke drive 32. At the grinding slide 30 a grinding spindle 34 is supported which can be driven rotatably by means of a motor 36 and which carries a grinding wheel 38.

Furthermore, at the machine frame 20 a feed slide 40 is movable to and fro in parallel to the saw blade guide 22 in the sense of the double arrow B by means of a feed drive 42. The feed slide 40 carries a cross slide 44 which is movable normally to the plane of the saw blade 10, at which cross slide a feed arm 46 is arranged in parallel to the plane of the saw blade 10.

The feed arm 46 comprises at its front end a feed finger 48 which extends normally to the plane of the saw blade 10 and is adjustable in such a manner that the feed finger can be brought into contact with the tooth face 14 of a tooth 12 with each working stroke in order to push the saw blade 10 depending on the setting of the feed drive 42 by one or several tooth spacings in a forward direction. The cross slide 44 is retractable from its illustrated operative position into an inoperative position in which the feed finger 48 does not reach the plane of the saw blade 10; in this inoperative position the feed slide 42 is therefore not operative in the sense of its normal function.

For the purpose of dressing of the grinding wheel 38 a template 50 is provided which is either a plate which consists entirely of polycrystalline diamond (PCD) or a compound plate where one or several PCD plates are soldered or glued onto a hard metal plate which in turn can be reinforced by a steel plate. The dressing template 50 is replaceably attached at a template holder 52 which in the illustrated example is formed by a two-arm lever and is supported at a bracket 54 so as to be pivotable about an axis C extending parallel to the plane of the saw blade 10 and to the feed direction (arrow B). The dressing template 50 is shown in its operative position; in this case it lies in close vicinity to the plane of the saw blade 10 within a plane which contains the axis of rotation D of the grinding wheel 38. From this operative position which is defined by an adjustable stop which is not shown, the template holder 52 together with the dressing template 50 can be pivoted by means of a piston/cylinder unit 56 about the axis C away from the saw blade 10 into an inoperative position in which it can be contacted by neither the saw blade 10 nor the grinding wheel 38. The piston/cylinder unit 56 is supported at the bracket 54, and its piston rod 58 is connected in an articulated manner with the template holder 52.

For the purpose of dressing of the grinding wheel 38 the feed drive 42 is appropriately shut down, but at least the cross slide 44 is moved into its inoperative position so that the feed finger 48 cannot engage the toothing of the saw blade 10. The dressing template 50 is then pivoted into its operative position. All of this can be effected during a normal return stroke of the grinding slide 30 after a grinding stroke. The next downward stroke of the grinding slide 30 is modified either CNC-controlled or by changing a cam drive which normally drives the grinding slide in such a manner that the grinding wheel 38 does not plunge into the saw blade but only into the dressing template 50 whose operative position is slightly higher than the toothing of the saw blade 10. The lower end point of this downward stroke determines the amount by which the grinding wheel 38 will be dressed. With the next upward stroke the stroke drive 32 is reversed again to normal operation, however, with the amount by which the radius of the grinding wheel 38 was reduced in the dressing operation being compensated by shifting of the lower end of the travel distance of the grinding slide 30. At the same time, the dressing template 50 is pivoted back into its inoperative position. The next cycle can already be a normal sharpening cycle during which coordinated motions of the grinding slide 30 and the feed slide 40 are carried out and result in correspondingly coordinated motions of the grinding wheel 38 and the saw blade 10 so that the sharpening operation of the saw blade 10 can be continued.

We claim:

1. An apparatus for the continuous path-controlled sharpening of saw toothings, comprising a saw blade holder (24), grinding slide (30) which carries a profiled grinding wheel (38) and is movable to and fro in a strokewise manner with respect to the saw blade holder (24), and a feed slide (40) by means of which a saw blade (10) in the saw blade holder (24) can be advanced in a stepwise manner, characterized in that, a dressing template (50) is arranged at the apparatus in a normally inoperative position and is adapted to be moved in intervals into an operative position in which the grinding wheel (38) is dressed by plunging into the dressing template (50), the feed slide (40) is adapted to be put out of operation during the dressing intervals, the stroke of the grinding slide (30) is adjustable prior to the next plunging motion into the saw blade (10) corresponding to the radius decrease of the grinding wheel (38) effected by dressing, which is further characterized in that the dressing template (50) in its operative position is arranged adjacent to the saw blade holder (24), and further characterized in that the dressing template (50) is adapted to be pivoted about a pivot axis (C) which extends parallel to the saw blade (10) from its inoperative position into its operative position.

2. The apparatus according to claim 1, characterized in that the dressing template (50) is replaceably attached at a template holder (52).

3. The apparatus according to claim 2, characterized in that the template holder (52) is supported at the saw blade holder (24).

4. The apparatus according to claim 1, characterized in that the dressing template (50) is a plate which at least partially consists of polycrystalline diamond.

5. An apparatus for the continuous path-controlled sharpening of saw toothings, comprising a saw blade holder (24), a grinding slide (30) which carries a profiled grinding wheel (38) and is movable to and fro in a strokewise manner with respect to the saw blade holder (24), and a feed slide (40) by means of which a saw blade (10) in the saw blade holder (24) can be advanced in a stepwise manner, characterized in that, a dressing template (50) is arranged at the apparatus in a normally inoperative position and is adapted to be moved in intervals into a stationary operative position in which the grinding wheel (38) is dressed by plunging into the dressing template (50), whereby the grinding wheel (38) will be dressed in a single work stroke of the grinding slide (30), the feed slide (40) is adapted to be put out of operation during the dressing intervals, and the stroke of the grinding slide (30) is adjustable prior to the next plunging motion corresponding to the radius decrease of the grinding wheel (38) effected by dressing.

* * * * *